(12) United States Patent
Mason et al.

(10) Patent No.: US 6,699,959 B2
(45) Date of Patent: Mar. 2, 2004

(54) POLYCARBONATE HAVING A LOW SHEAR THINNING BEHAVIOR

(75) Inventors: James Mason, Krefeld (DE); Silke Kratschmer, Krefeld (DE); Uwe Hucks, Alpen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/103,916

(22) Filed: Mar. 22, 2002

(65) Prior Publication Data

US 2003/0027973 A1 Feb. 6, 2003

(30) Foreign Application Priority Data

| Mar. 26, 2001 | (DE) | 101 14 805 |
| May 10, 2001 | (DE) | 101 22 496 |

(51) Int. Cl.[7] .............................. C08G 64/00
(52) U.S. Cl. ..................... 528/196; 502/9; 528/198
(58) Field of Search ................ 528/196, 198; 502/9

(56) References Cited

U.S. PATENT DOCUMENTS

| 5,340,905 A | 8/1994 | Kuhling et al. ............. 528/199 |
| 5,399,659 A | 3/1995 | Kuhling et al. ............. 528/199 |
| 5,932,683 A | 8/1999 | Hachiya et al. ............. 528/196 |
| 6,291,630 B1 | 9/2001 | Konig et al. ................. 528/196 |

OTHER PUBLICATIONS

Angewandte Chemie Nr. 20, Oct. 21, 1956 pp. 633–640 Dr. H. Schnell Polycarbonate, eine Gruppe neuartiger thermoplastischer Kunststoffe.

*Primary Examiner*—Terressa Boykin
(74) *Attorney, Agent, or Firm*—Joseph C. Gil; Aron Preis; Gary F. Matz

(57) ABSTRACT

A melt-polymerized polycarbonate is disclosed. The polycarbonate has a shear thinning ratio (y) that is defined by the limiting values of the following equation $$c+ax^b > y > -c+ax^b \qquad (Q)$$

wherein $y \geq 1$, $c = 0.3$ to $0.1$, $b = 14.831 \pm 0.05$ to $0.02$, $a = 0.1262 \pm 0.005$ to $0.003$ and $x$ is the relative viscosity of the polycarbonate. The polycarbonate exhibits a flow behavior similar to that of a linear polycarbonate of comparable molecular weight obtained by the interface polymerization process.

11 Claims, No Drawings

POLYCARBONATE HAVING A LOW SHEAR THINNING BEHAVIOR

FIELD OF THE INVENTION

The invention relates to polycarbonate resins and more particularly to a process for the preparation of polycarbonate.

SUMMARY OF THE INVENTION

A melt-polymerized polycarbonate is disclosed. The polycarbonate has a shear thinning ratio (y) that is defined by the limiting values of the following equation $$c+ax^b > y > -c+ax^b \qquad (Q)$$

wherein $y \geq 1$, $c=0.3$ to $0.1$, $b=14.831 \pm 0.05$ to $0.02$, $a=0.1262 \pm 0.005$ to $0.003$ and x is the relative viscosity of the polycarbonate. The polycarbonate exhibits a flow behavior similar to that of a linear polycarbonate of comparable molecular weight obtained by the interface polymerization process.

BACKGROUND OF THE INVENTION

Polycarbonate is produced industrially by means of the interface process or by trans-esterification in the melt (melt polymerization process). The melt polymerization process is becoming increasingly important since it can be carried out without the use of phosgene or chlorinated solvents. Polycarbonates produced by the interface polymerization process that is mainly used at the present time are linear, and such polymers do not contain any multifunctional structural units. This type of linear polycarbonate, which lacks the multifunctional structural units capable of undergoing branching, has only a slight non-Newtonian flow behavior.

Polycarbonates produced using the melt polymerization process contain multi-functional structural units, are highly branched, and have an excellent non-Newtonian flow behavior. The unavoidable production of multifunctional branching structural units during the polymerization is known and is described for example in Angewandte Chemie 20, pp. 633–660, 1956. On account of their different flow properties it is difficult to use these two types of polycarbonates interchangeably in for example injection molding processes or extrusion processes.

Typical melt-polymerized polycarbonate contains branching units that lead to an excellent, non-Newtonian flow behavior that is usually characterized by the shear thinning ratio. The branching unfortunately also leads to an unacceptable yellow discoloration.

DE 42 38 123 A describes a process for the production of melt-polymerized polycarbonate having a low proportion of branching units, though no details of the flow behavior of the resultant polycarbonate are given.

U.S. Pat. No. 5,932,683 discloses a typical melt polymerization process in which a typical branched polycarbonate is produced having a pronounced non-Newtonian flow behavior. In addition special branching structural units that are necessary for the pronounced non-Newtonian flow behavior are disclosed, as well as a special relationship between the reaction time and reaction temperature, a sufficient number of branching being produced within these defined parameters so as to achieve the pronounced non-Newtonian flow behavior while retaining the other good properties of the polycarbonate.

The object of the present invention is to provide a melt-polymerized polycarbonate having rheological properties that are comparable to those of an interface-polymerized polycarbonate, wherein these polycarbonates exhibit excellent color and color stability.

DETAILED DESCRIPTION OF THE INVENTION

This object is achieved by a melt-polymerized polycarbonate with a shear thinning ratio (y) that is defined by the limiting values of the following equation $$c+ax^b > y > -c+ax^b \qquad (Q)$$

for all $y \geq 1$, wherein a, b and c are constants, and $c=0.3$ to $0.1$, preferably $0.2$ to $0.1$, and most preferably about $0.1$, $b=14.83 \pm 0.05$ to $0.02$, preferably $\pm 0.04$ to $0.02$, and most preferably $\pm$about $0.02$, and $a=0.1262 \pm 0.005$ to $0.003$, preferably $\pm 0.004$ to $0.003$, and most preferably $\pm$about $0.003$, and x is the relative viscosity of the polycarbonate.

The shear thinning ratio serves to quantify the flow behavior. The shear thinning ratio is defined as the ratio of the viscosity at a low shear rate to the viscosity at a high shear rate. According to the invention the shear thinning ratio is the ratio of the viscosity at a shear rate of $50s^{-1}$ to the viscosity at a shear rate of $5,000 \, s^{-1}$ measured at 280° C.

It was surprisingly found that the polycarbonate produced according to the invention by melt polymerization (transesterification process) contains multifunctional structural units capable of branching but nevertheless exhibits a slight non-Newtonian flow behavior that is equivalent to that of linear polycarbonates produced by interface polymerization. This is surprising since all previously known melt-polymerized polycarbonates exhibit a very much more pronounced non-Newtonian flow behavior than linear polycarbonates. The polycarbonates according to the invention exhibit an excellent color stability during injection molding.

The melt-polymerized polycarbonates according to the invention correspond to the general formula (1)

$$Y \!\!-\!\!\left[\!\!O\!-\!M\!-\!O\!-\!\overset{\overset{\displaystyle O}{\|}}{C}\right]\!\!-\!\!OY \qquad (1)$$

wherein the square brackets denote repeating structural units,

M denotes Ar or a multifunctional compound A, B, C as well as compound D, wherein Ar is represented by Formula (2)

(2)

$$\underset{(R)n}{\text{[aromatic ring structure]}}$$

or particularly preferably a compound that is represented by Formula (3)

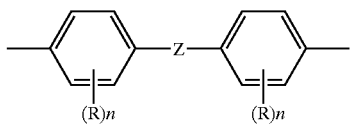 (3)

wherein

Z denotes $C_1$–$C_8$ alkylidene or $C_5$–$C_{12}$ cycloalkylidene, S, $SO_2$ or a single bond, R denotes a substituted or unsubstituted phenyl, methyl, propyl, ethyl, butyl, Cl or Br, and n denotes 0, 1 or 2, wherein the multifunctional compound A is a compound of the formula

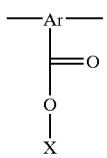 (A)

and may be contained in an amount of less than 1,500 ppm, preferably less than 1,000 ppm, most particularly preferably less than about 500 ppm in the polycarbonate, wherein the multifunctional compound B is a compound of the formula

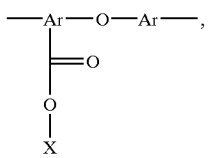 (B)

and may be contained in an amount of less than 350 ppm, preferably less than 250 ppm, most particularly preferably less than about 100 ppm in the polycarbonate, wherein the multifunctional compound C is a compound of the formula

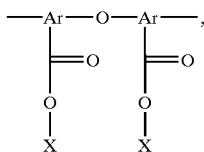 (C)

and may be contained in an amount of less than 200 ppm, preferably less than 150 ppm, most particularly preferably less than about 100 ppm in the polycarbonate, wherein compound D is a compound of the formula

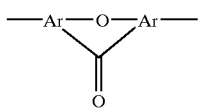 (D)

and may be contained in an amount of less than 750 ppm, preferably less than 500 ppm, most particularly preferably less than about 300 ppm in the polycarbonate, wherein Y is H or a compound of the formula (4)

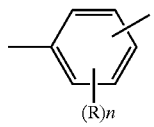 (4)

wherein

R may be identical or different and denotes H, $C_1$–$C_{20}$ alkyl, -alkylaryl, -cycloalkyl, -oxyalkyl, -oxyaryl, $C_6H_5$ or $C(CH_3)_2C_6H_5$, and n may be 0, 1, 2 or 3, wherein X=Y or —(MOCOO)Y, wherein M and Y have the meanings given above and these definitions also apply to the compounds mentioned hereinafter.

The polycarbonate according to the invention has a weight average molecular weight as determined by gel permeation chromatography of 5,000 to 80,000, preferably 10,000 to 60,000, and most particularly preferably 15,000 to 40,000.

Ar preferably has the following meaning:

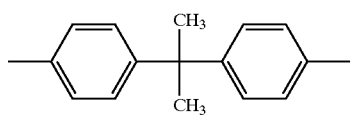 (2.1)

Preferably the multifunctional compound A corresponds to the following formula:

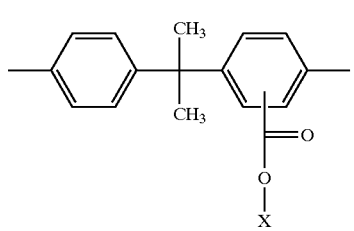 (A1)

Preferably the multifunctional compound B corresponds to the following formula:

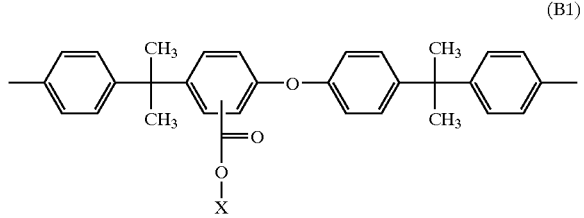 (B1)

Preferably the multifunctional compound C corresponds to the following formula:

(C1)

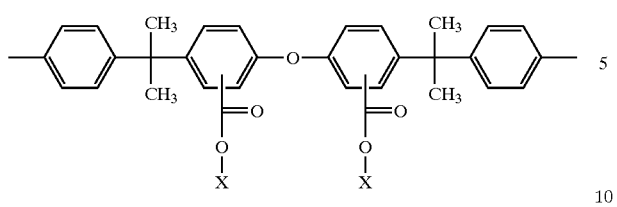

Preferably the multifunctional compound D corresponds to the following formula:

(D1)

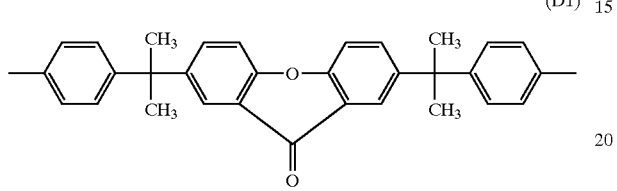

The production of aromatic polycarbonates according to the melt transesterification process is known and is described for example in "Schnell", Chemistry and Physics of Polycarbonates, Polymer Reviews, Vol. 9, Interscience Publishers, New York, London, Sydney 1964, in D. C. Prevorsek, B. T. Debona and Y. Kesten, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75–90 (1980), in D. Freitag, U. Grigo, P. R. Müller, N. Nouvertne, Bayer AG, "Polycarbonates" in Encyclopedia of Polymer Science and Engineering, Vol. 11, Second Edition, 1988, pp. 648–718 and finally in U. Grigo, K. Kircher and P. R. M Müller "Polycarbonate" in Becker/Braun, Kunststoff-Handbuch, Vol. 3/1, Polycarbonates, Polyacetals, Polyesters, Cellulose esters, Carl Hanser Verlag Munich, Vienna, 1992, pp. 117–299.

The polycarbonate according to the invention, which may also be a polyester carbonate, is produced by the melt transesterification reaction of suitable diphenol and carbonic acid diaryl esters in the presence of a suitable catalyst. The polycarbonate may also be obtained by the condensation of carbonate oligomers containing hydroxy terminal groups or carbonate terminal groups, and suitable diphenols as well as carbonic acid diaryl esters.

Suitable carbonic acid diaryl esters in the context of the invention are di-$C_6$ to $C_{14}$ aryl esters, preferably the diesters of phenol or of alkyl-substituted phenols, i.e. diphenyl carbonate, dicresyl carbonate and di-4-tert.-butylphenyl carbonate. Diphenyl carbonate is particularly preferred.

Suitable carbonate oligomers are described by the above Formula (1) with molecular weights of 220 to 15,000.

Suitable di-$C_6$–$C_{14}$ aryl esters also include asymmetrical diaryl esters that contain a mixture of aryl substituents. Most particularly preferred are phenylcresyl carbonate and 4-tert.-butylphenyl phenylcarbonate.

Suitable diaryl esters also include mixtures of more than one di-$C_6$–$C_{14}$ aryl ester. Most particularly preferred are mixtures of diphenyl carbonate, dicresyl carbonate and di-4-ter.-butylphenyl carbonate.

Referred to 1 mole of diphenol, the carbonic acid diaryl esters may be used in amounts of 1.00 to 1.30 mole, particularly preferably in amounts of 1.02 to 1.20 mole, and most particularly preferably in amounts of 1.05 to 1.15 mole.

Suitable dihydroxybenzene compounds in connection with the invention are those that correspond to Formula (5):

(5)

wherein

R denotes a substituted or unsubstituted phenyl, methyl, propyl, ethyl, butyl, Cl or Br, and n denotes 0, 1 or 2.

Most particularly preferred dihydroxybenzene compounds are 1,3-dihydroxybenzene, 1,4-dihydroxybenzene and 1,2-dihydroxybenzene.

Suitable diphenols in the context of the invention are those that correspond to Formula (6):

(6)

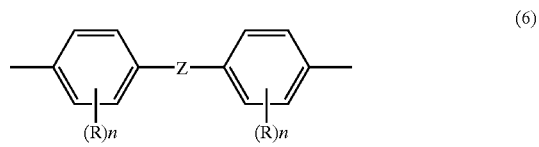

wherein

Z denotes $C_1$–$C_8$ alkylidene or $C_5$–$C_{12}$ cycloalkylidene, S, $SO_2$ or a single bond, R denotes a substituted or unsubstituted phenyl, methyl, propyl, ethyl, butyl, Cl or Br, and n denotes 0, 1 or 2.

Preferred diphenols are 4,4'-dihydroxydiphenyl, 4,4'-dihydroxy-diphenyl sulfide, 1,1-bis(4-hydroxyphenyl)cyclohexane, 1,2-bis(4-hydroxyphenyl)benzene, 1,3-bis-(4-hydroxyphenyl)benzene, 1,4-bis(4-hydroxyphenyl)benzene, bis(4-hydroxy-phenyl)-methane, 2,2-bis(4-hydroxyphenyl)propane, 2,4-bis(4-hydroxyphenyl)-2-methyl-butane, 2,2-bis(3-methyl-4-hydroxyphenyl)propane, 2,2-bis(3-chloro-4-hydroxy-phenyl)-2-propane, bis(3,5-dimethyl-4-hydroxyphenyl)methane, 2,2-bis-(3,5-di-methyl-4-hydroxyphenyl)propane, bis(3,5-dimethyl-4-hydroxyphenyl)-sulfone, bis(4-hydroxyphenyl)sulfone, 1,2-bis[2-(4-hydroxyphenyl)isopropyl]-benzene, 1,3-bis[2-(4-hydroxyphenyl)isopropyl]benzene, 1,4-bis[2-(4-hydroxyphenyl)isopropyl] -benzene, 1,1-bis(4-hydroxyphenyl)-1-phenylethane, 2,4-bis(4-hydroxyphenyl)-2-methylbutane, 2,2-bis(3,5-dichloro-4-hydroxyphenyl)propane, 2,2-bis(3,5-dibromo-4-hydroxyphenyl)propane, and 1,1-bis(4-hydroxyphenyl)-3,3,5-trimethylcyclohexane.

The most particularly preferred diphenols are 1,1-bis(4-hydroxyphenyl)-1-phenyl-ethane, 2,2-bis(4-hydroxyphenyl)propane, 4,4'-dihydroxydiphenyl, 1,1-bis(4-hydroxyphenyl)- 3,3,5-trimethylcyclohexane, 2,2-bis(3,5-dibromo-4-hydroxy-phenyl)-propane and 1,3-bis[2-(4-hydroxyphenyl)isopropyl]benzene.

Suitable diphenols also include mixtures of more than one diphenol, a copoly-carbonate being formed if a mixture were used. The most particularly preferred mixtures are 1,3-bis [2-(4-hydroxyphenyl)isopropyl]benzene, 1,1-bis(4-hydroxy-phenyl)-3,3,5-trimethylcyclohexane, 2,2-bis(4-hydroxyphenyl)propane, 4,4'-dihydroxydiphenyl and 2,2-bis(3,5-dibromo-4-hydroxy-phenyl)propane.

In addition a branching agent may be added, such as compounds that contain three functional phenolic OH groups. This would obviously branch the polymer and would increase the non-Newtonian flow behavior of the polymer.

Suitable branching agents include phloroglucinol, 3,3-bis(3-methyl-4-hydroxyphenyl)-2-oxo-2,3-di-hydroindole, 4,6-dimethyl-2,4,6-tris(4-hydroxyphenyl)heptene-2, 4,6-dimethyl-2,4,6-tris(4-hydroxyphenyl)heptane, 1,3,5-tris(4-hydroxyphenyl)benzene, 1,1,1-tris-(4-hydroxyphenyl) ethane, tris(4-hydroxyphenyl)phenylmethane, 2,2-bis-[4,4-bis(4-hydroxyphenyl)cyclohexyl]propane, 2,4-bis(4-hydroxyphenylisopropyl)-phenol, 2,6-bis(2-hydroxy-5'-methylbenzyl)-4-methylphenol, 2-(4-hydroxyphenyl)-2-(2,4-dihy-droxyphenyl)propane, hexakis(4-(4-hydroxyphenylisopropyl)phenyl)-orthotere-phthalate, tetrakis(4-hydroxyphenyl)methane, tetrakis(4-(4-hydroxyphenyl-iso-propyl)-phenoxy)methane and 1,4-bis((4',4"-dihydroxytriphenyl)methyl)benzene, isatin biscresol, pentaerythritol, 2,4-dihydroxybenzoic acid, trimesic acid and cyanuric acid.

Suitable catalysts for the production of the polycarbonates according to the invention are for example those of the general formula (7)

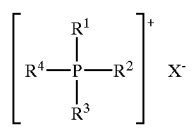

(7)

wherein $R^1$, $R^2$, $R^3$ and $R^4$, which are identical or different, denote $C_1$ to $C_{18}$ alkylenes, $C_6$ to $C_{10}$ aryls or $C_5$ to $C_6$ cycloalkyls, and $X^-$ denotes an anion in which the corresponding acid-base pair $H^+ + X^- \leftrightarrows HX$ has a $pK_b$ of <11.

Preferred catalysts are tetraphenylphosphonium fluoride, tetraphenylphosphonium tetraphenyl borate and tetraphenylphosphonium phenolate. Most particularly preferred is tetraphenylphosphonium phenolate. Preferred amounts of phosphonium salt catalysts are $10^{-2}$ to $10^{-8}$ mole per mole of diphenol, the most particularly preferred amounts of catalysts being $10^{-4}$ to $10^{-6}$ mole per mole of diphenol. Further co-catalysts may optionally also be added to the phosphonium salt in order to increase the rate of the polymerization. Such co-catalysts include salts of alkali metals and alkaline earth metals, such as hydroxides, alkoxides and aryl oxides of lithium, sodium and potassium, preferably hydroxide, alkoxide or aryl oxide salts of sodium. Most particularly preferred are sodium hydroxide and sodium phenolate. The amounts of the co-catalyst may be in the range from 1 to 200 ppb, preferably 5 to 150 ppb, and most particularly preferably 10 to 125 ppb, in each case calculated as sodium.

The polycarbonates may be produced under reaction conditions that are carried out in temperature stages from 150° to 400° C., the residence time in each stage may be 15 minutes to 5 hours, and the pressures are 1000 to 0.01 mbar.

The present invention also provides polycarbonate compositions that contain the polycarbonates according to the invention, as well as molded articles containing such compositions.

The compositions according to the invention may contain, in addition to the polycarbonates or polyester carbonates, further polymeric constituents and conventional additives. Possible polymeric constituents are for example styrene/acrylic/nitrile terpolymers (SAN), acrylic/butadiene/styrene terpolymers (ABS), poly(methyl methacrylate) (PMMA), flourinated polyeolefins (PTFE), polyphenylene sulfide (PPS), polyolefins such as polyethylene, polypropylene and ethylene/propylene rubbers, epoxy resins, polyesters such as polybutylene terephthalate (PBT), polyethylene terephthalate (PET), polycyclohexene dimethanol (PCT), copolyesters of ethylene glycol and cyclohexene dimethanol terephthalic acid in a ratio of the two constituents of 1:4 (PCTG), copolyesters of ethylene glycol and cyclohexene dimethanol terephthalic acid in a ratio of the two constituents of 4:1 (PETG), as well as other polycarbonates produced by the interface process and also mixtures of the aforementioned components. Further additives include mold release agents, stabilisers, antioxidants, flame retardants, coloring agents and pigments, antistatics, nucleating agents, anti-trickle agents, as well as organic and further inorganic fillers and reinforcing agents.

The polycarbonate according to the invention may be contained in the composition according to the invention in an amount of preferably 5 to 95 wt. %, particularly preferably 10 to 90 wt. %, and most particularly preferably 20 to 80 wt. %, referred to the weight of the composition. The further polymeric constituents of the composition according to the invention may be contained in an amount of preferably 1 to 60 wt. %, particularly preferably 1 to 40 wt. %, and most particularly preferably 2 to 30 wt. %, referred to the weight of the composition.

The compositions may contain up to 60 wt. %, preferably 10 to 40 wt. %, referred to the filled or reinforced molding composition, of inorganic materials such as fillers and/or reinforcing agents. Flame retardants may be contained in the composition according to the invention in an amount of up to 35 wt. %, preferably 10 to 25 wt. %, relative to the weight of the composition.

These and further constituents or additives that may be contained in the compositions according to the invention, in addition to the polycarbonates/polyester carbonates, are illustrated hereinafter by means of examples.

These substances may be found in many publications, such as for example in the Additives for Plastics Handbook, John Murphy, 1999 and are commercially available.

1. Suitable Antioxidants are for Example 1.1. Alkylated monophenols, for example 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-isobutylphenol, 2,6-dicyclopentyl-4-methylphenol, 2-(α-methylcyclohexyl)4,6-dimethylphenol, 2,6-dioctadecyl-4-methylphenol, 2,4,6-tricyclohexylphenol, 2,6-di-tert.-butyl-4-methoxymethylphenol, nonylphenols that may be linear or branched in the side chain, for example 2,6-dinonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol.

1.2. Alkylthiomethylphenols, for example 2,4-dioctylthiomethyl-6-tert.-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert.-butyl-4-methoxyphenol, 2,5-di-tert.-butylhydroquinone, 2,5-di-tert.-amylhydroquinone, 2,6-diphenyl-4-octadecyloxyphenol, 2,6-di-tert.-butylhydroquinone, 2,5-di-tert.-butyl-4-hydroxyanisole, 3,5-di-tert.-butyl-4-hydroxyanisole, 3,5-di-tert.-butyl-4-hydroxy-phenyl stearate and bis(3,5-di-tert.-butyl-4-hydroxyphenyl)adipate.

1.4. Tocopherols, for example a-tocopherol, β-tocopherol, γ-tocopherol, δ-tocopherol, and mixtures thereof (vitamin E).

1.5. Hydroxylated thiodiphenyl ethers, for example 2,2'-thiobis(6-tert.-butyl-4-methylphenol), 2,2'-thiobis(4- octylphenol), 4,4'-thiobis(6-tert.-butyl-3-methyl-phenol), 4,4'-thiobis(6-tert.-butyl-2-methylphenol), 4,4'-thiobis(3,6-di-sec-amyl-phenol), 4,4'-bis(2,6-dimethyl-4-hydroxyphenol)disulfide.

1.6 Alkylidene bisphenols, for example 2,2'-methylenebis(6-tert.-butyl-4-methyl-phenol), 2,2'-methylenebis(6-tert.-butyl-4-ethylphenol), 2,2'-methylenebis[4-methyl-6-(α-methylcyclohexyl)phenol], 2,2'-methylenebis(4-methyl-6-cyclohexyl-phenol), 2,2'-methylenebis(6-nonyl-4-methylphenol), 2,2'-methylenebis(4,6-di-tert.-butyl-phenol), 2,2'-ethylidenebis(4,6-di-tert.-butylphenol), 2,2'-ethylidenebis-(6-tert.-butyl-4-isobutylphenol), 2,2'-methylenebis[6-(α-methylbenzyl)-4-nonyl-phenol), 2,2'-methylenebis[6-(α,α-dimethylbenzyl)-4-nonylphenol], 4,4'-methylenebis(2,6-di-tert.-butylphenol), 4,4'-methylenebis(6-tert.-butyl-2-methyl-phenol), 1,1-bis(5-tert.-butyl-4-hydroxy-2-methylphenyl)butane, 2,6-bis(3-tert.-butyl-5-methyl-2-hydroxybenzyl)-4-methylphenol, 1,1,3-tris(5-tert.-butyl-4-hydroxy-2-methylphenyl)butane, 1,1-bis(5-tert.-butyl-4-hydroxy-2-methylphenyl)-3-n-dodecylmercaptobutane, ethylene glycol-bis[3,3-bis(3'-tert.-butyl-4'-hydroxy-phenyl)butyrate], bis(3-tert.-butyl-4-hydroxy-5-methylphenyl)dicyclo-pentadiene, bis[2-(3'-tert.-butyl-2'-hydroxy-5'-methylbenzyl)-6-tert.-butyl-4-methylphenyl]-terephthalate, 1,1-bis(3,5-dimethyl-2-hydroxyphenyl)-butane, 2,2-bis(3,5-di-tert.-butyl-4-hydroxyphenyl)propane, 2,2-bis(5-tert.-butyl-4-hydroxy-2-methylphenyl)-4-n-dodecylmercaptobutane, 1,1,5,5-tetra-(5-tert.-butyl-4-hydroxy-2-methylphenyl)-pentane.

1.7. O-, N- and S-benzyl compounds, for example 3,5,3',5'-tetra-tert.-butyl-4,4'-dihydroxydibenzyl ether, octadecyl-4-hydroxy-3,5-dimethylbenzyl mercaptoacetate, tridecyl-4-hydroxy-3,5-di-tert.-butylbenzyl mercaptoacetate, tris(3,5-di-tert.-butyl-4-hydroxybenzyl)amine, bis(4-tert.-butyl-3-hydroxy-2,6-dimethylbenzyl)dithio-tere-phthalate, bis(3,5-di-tert.-butyl-4-hydroxybenzyl)sulfide, isooctyl-3,5-di-tert.-butyl-4-hydroxybenzyl mercaptoacetate.

1.8. Hydroxybenzylated malonates, for example dioctadecyl-2,2-bis(3,5-di-tert.-butyl-2-hydroxybenzyl) malonate, dioctadecyl-2-(3-tert.-butyl-4-hydroxy-5-methyl-benzyl)malonate, didodecylmercaptoethyl-2,2-bis(3,5-di-tert.-butyl-4-hydroxy-benz-yl)malonate, bis[4-(1,1,3,3,-tetramethylbutyl)phenyl]-2,2-bis(3,5-di-tert.-butyl-4-hydroxybenzyl)malonate.

1.9. Aromatic hydroxybenzyl compounds, for example 1,3,5-tris-(3,5-di-tert.-butyl-4-hydroxybenzyl)-2,4,6-trimethylbenzene, 1,4-bis(3,5-di-tert.-butyl-4-hydroxy-benzyl)-2,3,5,6-tetramethylbenzene, 2,4,6-tris(3,5-di-tert.-butyl-4-hydroxybenzyl)-phenol.

1.10. Triazine compounds, for example 2,4-bis(octylmercapto)-6-(3,5-di-tert.-butyl-4-hydroxyanilino)-1,3,5-triazine, 2-octylmercapto-4,6-bis(3,5-di-tert.-butyl-4-hydroxyanilino)-1,3,5-triazine, 2-octylmercapto-4,6-bis(3,5-di-tert.-butyl-4-hydroxyphenoxy)-1,3,5-triazine, 2,4,6-tris(3,5-di-tert.-butyl-4-hydroxyphenoxy)-1,2,3-triazine, 1,3,5-tris(3,5-di-tert.-butyl-4-hydroxybenzyl)isocyanurate, 1,3,5-tris(4-tert.-butyl-3-hydroxy-2,6-dimethylbenzyl)isocyanurate, 2,4,6-tris(3,5-di-tert.-butyl-4-hydroxyphenylethyl)-1,2,3-triazine, 1,3,5-tris(3,5-di-tert.-butyl-4-hydroxy-phenylpro-pioyl)-hexahydro-1,3,5-triazine, 1,3,5-tris(3,5-dicyclohexyl-4-hydroxy-benzyl)isocyanurate.

1.11. Acylaminophenols, for example 4-hydroxylauranilide, 4-hydroxystearanilide, octyl-N-(3,5-di-tert.-butyl-4-hydroxyphenyl)carbamate.

1.12. Esters of β-(3,5-di-tert.-butyl-4-hydroxyphenyl) propionic acid with monohydric or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)-oxamide, 3-thiaundecanol, 3-thiapentadecanol, trimethylhexanediol, trimethylol-propane, 4-hydroxymethyl-1-phospha-2,6,7-trioxabicyclo[2.2.2] octane.

1.13 Esters of β-(5-tert.-butyl-4-hydroxy-3-methylphenyl)propionic acid with monohydric or polyhydric alcohols, for example with methanol, ethanol, n-octanol, i-octanol, octadecanol, 1,6-hexanediol, 1,9-nonanediol, ethylene glycol, 1,2-propane-diol, neopentyl glycol, thiodiethylene glycol, diethylene glycol, triethylene glycol, pentaerythritol, tris(hydroxyethyl)isocyanurate, N,N'-bis(hydroxyethyl)-oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14 Esters of β-(3,5-dicyclohexyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert.-butyl-4-hydroxyphenylacetic acid with monohydric or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert.-butyl-4-hydroxypenyl) propionic acid, for example N,N'-bis(3,5-di-tert.-butyl-4-hydroxyphenylpropionyl)hexa-methylenediamide, N,N'-bis (3,5-di-tert.-butyl-4-hydroxyphenyl-propionyl) trimethylenediamide, N,N'-bis(3,5-di-tert.-butyl-4-hydroxyphenylpropionyl)hydrazide, N,N'-bis[2-(3-[3,5-di-tert.-butyl-4-hydroxyphenyl]propionyloxy)ethyl]oxamide, (Naugard® XL-1 from Uniroyal).

1.17 Ascorbic acid (vitamin C)

1.18. Amine antioxidants, for example N,N'-diisopropyl-p-phenylenediamine, N,N'-di-sec-butyl-p-phenylenediamine, N,N'-bis(1,4-dimethylpentyl)-p-phenylene-di-amine, N,N'-bis(1-ethyl-3-methylpentyl)-p-phenylenediamine, N,N'-bis(1-methyl-heptyl-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclo-hexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyl-diphenylamine, 4-isopropoxydiphenylamine, N-phenyl-1-naphthylamine, N-(4-tert.-octylphenyl)-1-naphthylamine, N-phenyl-2-naphthylamine, octylated diphenylamine, for example p,p'-di-tert.-octyldiphenylamine, 4-n-butylaminophenol, 4-n- butyrylaminophenol, 4-nonanoylaminophenol, 4-dodecanoylaminophenol,4-octadecanoylaminophenol, bis-(4-methoxyphenol)amine, 2,6-di-tert.-butyl-4-dimethylaminomethylphenol, 2,4'-diaminodiphenylmethane, 4,4'-diamino-diphenylmethane, N,N,N',N'-tetramethyl-4,4'-diaminodiphenylmethane, 1,2-bis[(2-methylphenyl)amino]ethane, 1,2-bis-(phenylamino) propane, (o-tolyl)biguanide, bis[4-(1',3'-dimethylbutyl) phenyl]amine, tert.-octylated N-phenyl-l-naphthylamine, a mixture of monoalkylated and dialkylated tert.-butyl/tert.-octyldiphenylamines, a mixture of monoalkylated and dialkylated nonyldiphenylamines, a mixture of monoalkylated and dialkylated dodecyldiphenylamines, a mixture of monoalkylated and dialkylated isopropyl/-isohexyldiphenylamines, a mixture of monoalkylated and dialkylated tert.-butyl-diphenylamines, 2,3-dihydro-3,3-dimethyl-4H-1,4-benzo-thiazine, phenothiazine, a mixture of monoalkylated and dialkylated tert.-butyl/tert.-octyl phenothiazines, a mixture of monoalkylated and dialkylated tert.-octyl phenothiazines, N-allyl-phenothiazine, N,N,N',N'-tetraphenyl-1,4-diaminobut-2-ene, N,N-bis(2,2,6,6-tetra-methylpiperid-4-yl-hexamethylenediamine, bis(2,2,6,6-tetra-methylpiperid-4-yl)-sebacate, 2,2,6,6-tetramethylpiperidin-4-one, 2,2,6,6-tetramethylpiperidin-4-ol. Individual compounds or mixtures thereof may be used.

1.19. Suitable thiosynergists are for example dilauryl thiodipropionate and/or distearyl thiodipropionate.

2. UV-absorbers and light stabilisers may be used in the compositions according to the invention in amounts of 0.1 to 15 wt. %, preferably 3 to 8 wt. %, relative to the weight of the composition. Suitable UV-absorbers and light stabilisers are for example:

2.1. 2-(2'hydroxyphenyl)benzotriazoles, for example 2-(2'-hydroxy-5'-methyl-phenyl benzotriazole, 2-(3',5'-di-tert.-butyl-2'-hydroxyphenyl)benzotriazole, 2-(5'-tert.-butyl-2'-hydroxyphenylbenzotriazole, 2-(2'-hydroxy-5'-(1,1, 3,3-tetramethyl-butyl-phenyl)benzotriazole, 2-(3',5'-di-tert.-butyl-2'-hydroxyphenyl)-5-chloro-benzotri-azole, 2-(3'-tert.-butyl-2'-hydroxy-5'-methylphenyl)-5-chlorobenzotriazole, 2-(3'-sec-butyl-5'-tert.-butyl-2'-hydroxyphenyl)benzotriazole, 2-(2'-hydroxy-4'-octyloxy-phenyl)benzotriazole, 2-(3',5'-di-tert.-amyl-2'-hydroxyphenyl)benzo-triazole, 2-(3',5'-bis(α,α-dimethylbenzyl)-2'-hydroxyphenyl)benzotriazole, 2-(3'-tert.-butyl-2'-hydroxy-5'-(2-octyloxycarbonylethyl)phenyl)-5-chlorobenzotriazole, 2-(3'-tert.-butyl-5'-[2-(2-ethylhexyloxy)carbonylethyl]-2'-hydroxyphenyl)-5-chlorobenzotriazole, 2-(3'-tert.-butyl-2'-hydroxy-5'-(2-methoxycarbonylethyl)-phenyl)-5-chlorobenzotriazole, 2-(3'-tert.-butyl-2'-hydroxy-5'-(2-methoxycarbonyl-ethyl) phenyl)-benzotriazole, 2-(3'-tert.-butyl-2'-hydroxy-5'-(2-octyloxycarbonyl-ethyl)phenyl)-benzotriazole, 2-(3'-tert.-butyl-5'-[2-(2-ethylhexyloxy)carbonylethyl]-2'-hydroxy-phenyl)benzotriazole, 2-(3'-dodecyl-2'-hydroxy-5'-methylphenyl)-benzotriazole, 2-(3'-tert.-butyl-2'-hydroxy-5' (2-isooctyloxycarbonylethyl)phenyl-benzotriazole, 2,2 methylenebis[4-(1,1,3,3,-tetramethylbutyl)-6-benzotriazol-2-ylphenol]; the transesterification product of 2-[3'-tert.-butyl-5'-(2-methoxycarbonyl-ethyl)-2'-hydroxy-phenyl]-2H-benzotriazole with polyethylene glycol 300; [R—CH$_2$CH$_2$—COO—CH$_2$CH$_2$-]$_2$, wherein R=3'-tert.-butyl-4'-hydroxy-5'-2H-benzo-triazol-2-yl-phenyl, 2-[2'-hydroxy-3'-(α,α-dimethylbenzyl)-5'-(1,1,3,3-tetramethyl-butyl)phenyl]benzo-tri-azole, 2-[2'-hydroxy-3'-(1,1,3,3-tetramethylbutyl)-5'-(α,α-di-methylbenzyl)phenyl]-benzotriazole.

2.2. 2-hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert.-butylphenyl salicylate, phenyl salicylate, octylphenyl salicylate, dibenzoyl resorcinol, bis(4-tert.-butylbenzoyl)resorcinol, benzoyl resorcinol, 2,4-di-tert.-butylphenyl-3,5-di-tert.-butyl-4-hydroxybenzoate, hexadecyl-3,5-di-tert.-butyl-4-hydroxybenzoate, octadecyl-3,5-di-tert.-butyl-4-hydroxybenzoate, 2-methyl-4,6-di-tert.-butylphenyl-3,5-di-tert.-butyl-4-hydroxybenzoate.

2.4. Acrylates, for example ethyl-a-cyan-β, β-diphenyl acrylate, isooctyl-α-cyan-β, β-diphenyl acrylate, methyl-a-carbomethoxy cinnamate, methyl-α-cyan-β-methyl-p-methoxy cinnamate, butyl-a-cyan-p-methyl-p-methoxy cinnamate, methyl-α-carbomethoxy-p-methoxy cinnamate and N-(β-carbomethoxy-β-cyanvinyl)-2-meth-ylindoline.

2.5. Nickel compounds, for example nickel complexes of 2,2'-thiobis[4-(1,1,3,3-tetramethylbutyl)phenol], such as the 1:1 complex or 1:2 complex, with or without additional ligands, such as n-butylamine, triethanolamine or N-cyclohexyl-diethanolamine, nickel dibutyl dithiocarbamate, nickel salts of monoalkyl esters, for example of the methyl or ethyl ester, of 4-hydroxy-3,5-di-tert.-butylbenzyl-phosphonic acid, nickel complexes of ketoximes, for example of 2-hydroxy-4-methylphenylundecyl ketoxime, nickel complexes of 1-phenyl-4-lauroyl-5-hydroxypyrazole, with or without additional ligands.

2.6 Sterically hindered amines, for example bis(2,2,6,6-tetramethyl-4-piperidyl)-sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis-(1,2,2,6,6-pentamethyl-4-piperidyl), n-butyl-3,5-di-tert.-butyl-4-hydroxybenzyl malonate, the condensate of 1-(2-hydroxyethyl)-2,2,6,6,-tetramethyl-4-hydroxy-piperidine and succinic acid, linear or cyclic condensates of N,N'-bis(2,2,6,6-tetramethyl-4-piperidyl) hexamethylenediamine and 4-tert.-octylamino-2,6-dichloro-1,3,5-triazine, tris(2,2,6,6-tetramethyl-4-piperidyl)-nitrilotriacetate, tetrakis(2,2,6,6-tetramethyl-4-piperidyl)-1, 2,3,4-butanetetra-carboxylate, 1,1'-(1,2-ethanediyl)bis-(3,3, 5,5-tetramethylpiperazinone), 4-benzoyl-2,2,6,6,-tetramethylpiperidine, 4-stearyloxy-2,2,6,6,-tetramethylpiperidine, bis(1,2,2,6,6-pentamethylpiperidyl)-2-n-butyl-2-(2-hydroxy-3,5-di-tert.-butyl-benzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)-sebacate, bis(1-octyloxy-2,2,6,6-tetramethylpiperidyl) succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-do-decyl-1-(2,2,6,6-tetra-methyl-4-piperidyl) pyrrolidine-2,5-dione, 3-dodecyl-1-(1,2,2,6,6-pentamethyl-4-piperidyl)pyrrolidine-2,5-dione, a mixture of 4-hexadecyloxy-and 4-stearyloxy-2,2,6,6-tetramethylpiperidine, a condensation product of N,N'-bis(2,2,6,6-tetramethyl-4-piperidyl)hexamethylenediamine and 4-cyclo-hexylamino-2,6-dichloro-1,3,5-triazine, a condensation product of 1,2-bis(3-aminopropyl-amino)ethane and 2,4,6-trichloro-1,3,5-triazine as well as 4-butyl-amino-2,2,6,6-tetramethylpiperidine (CAS Reg. No. [136504-96-6]; N-(2, 2,6,6-tetramethyl-4-piperidyl)-n-dodecylsuccinimide, N-(1,2,2,6,6-pentamethyl-4-piperid-yl)-n-dodecyl-succinimide, 2-undecyl-7,7,9,9-tetramethyl-1-oxa-3,8-diaza-4-oxo-spiro[4.5]decane, a reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyl-oxocarbonyl)-2-(4-methoxyphenyl)ethene, N,N'-bis(formyl)-N,N'-bis(2,2,6,6-tetramethyl-4-piperidyl) hexamethylenediamine, diesters of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)] siloxane, reaction product of maleic anhydride/α-olefin copolymer with 2,2,6,6-tetramethyl-4-amino-piperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert.-butoxanilide, 2,2'-didodecyloxy-5,5'-di-tert.-butoxanilide, 2-ethoxy-2'-ethoxyanilide, N,N'-bis(3-dimethylamino-propyl)oxamide, 2-ethoxy-5-tert.-butyl-2'-ethoxyanilide and its mixture with 2-ethoxy-2'-ethyl-5,4'-di-tert.-butoxanilide, mixtures of o- and p-methoxy-disubstituted oxanilides and mixtures of o- and p-ethoxy-disubstituted oxanilides.

2.8. 2-2(2-hydroxyphenyl)-1,3,5-triazines, for example 2,4,6-tris(2-hydroxy-4-octyl-oxyphenyl)-1,3,5-triazine, 2-(2-hydroxy-4-octyloxyphenyl)-4,6-bis(2,4-di-methyl-phenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-tri-azine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxy-phenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyl-oxy]phenyl} -4,6-bis(2,4-dimethylphenyl)-1,3,5-triazine.

Individual compounds or mixtures thereof may be used.

3. Suitable metal deactivators are for example N,N'-diphenyloxamide, N-salicylal-N'-salicyloylhydrazine, N,N'-bis(salicyloyl)hydrazine, N,N'-bis(3,5-di-tert.-butyl-4-hydroxyphenylpropionyl)hydrazine, 3-salicyloylamino-1,2,4-triazole, bis(benzyl-idene)oxalyl dihydrazide, oxanilide, isophthaloyl dihydrazide, sebacoylbisphenyl hydrazide, N,N'-diacetyladipoyl dihydrazide, N,N'-bis(salicyloyl) oxalyl dihydrazide, N,N'-bis(salicyloyl)thiopropionyl dihydrazide. Individual compounds or mixtures thereof may be used.

4. Suitable phosphites and phosphonites that may be used as heat stabilisers include for example triphenyl phosphite, diphenylalkyl phosphites, phenyldialkyl phosphites, tri(nonylphenyl)phosphite, trilauryl phosphite, trioctadecyl phosphite, distearyl-pentaerythritol diphosphite, tris(2,4-di-tert.-butylphenyl)phosphite, diisodecyl-pentaerythritol diphosphite, bis(2,4-di-tert.-butylphenyl)pentaerythritol diphosphite, bis(2,6-di-tert.-butyl-4-methylphenyl) pentaerythritol diphosphite, diisodecyloxy-pentaerythritol diphosphite, bis(2,4-di-tert.-butyl-6-methylphenyl)-pentaerythritol diphosphite, bis(2,4,6-tris(tert.-butylphenyl) pentaerythritol diphosphite, tristearyl-sorbitol triphosphite, tetrakis(2,4-di-tert.-butylphenyl)-4,4'-biphenylene diphosphonite, 6-isooctyloxy-2,4,8, 10-tetra-tert.-butyl-12H-dibenz-[d,g]-1,3,2-dioxaphos-phocine, 6-fluoro-2,4,8, 10-tetra-tert.-butyl-12-methyldibenz-[d,g]-1,3,2-dioxaphos-phocine, bis(2,4-di-tert.-butyl-6-methylphenyl)methyl phosphite, bis(2,4-di-tert.-butyl-6-methylphenyl)ethyl phosphite, 6-fluoro-2,4,8,10-tetra-tert.-butyl-12-methyl-dibenz[d,g]-1,3,2-dioxaphosphocine, 2,2',2"-nitrilo-[triethyltris(3,3',5,5'-tetra-tert.-butyl-1,1'-biphenyl-2,2'-diyl) phosphite], 2-ethyl-hexyl(3,3',5 ,5'-tetra-tert.-butyl-1,1'-biphenyl-2,2'-diyl)phosphite, 5-butyl-5-ethyl-2-(2,4,6-tri-tert.-butylphenoxy)-1,3,2-dioxaphosphirane. Individual compounds or mixtures thereof may be used.

Particularly preferred are tris(2,4-di-tert.-butylphenyl) phosphite (Irgafos® 168, Ciba-Geigy), triphenyl phosphine, or (2,4,6-tri-tert.-butylphenyl)-(2-butyl-2-ethylpropane-1,3-diyl)phosphite (Ultranox 641®, GE Specialty Chemicals).

Examples of suitable phosphites and phosphonites are also:

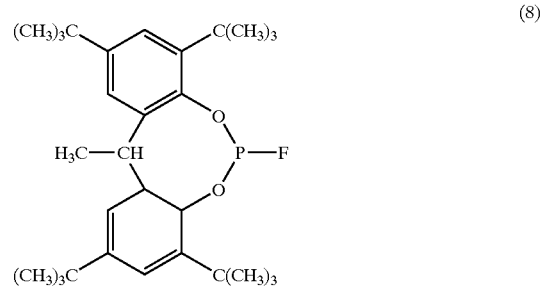

(8)

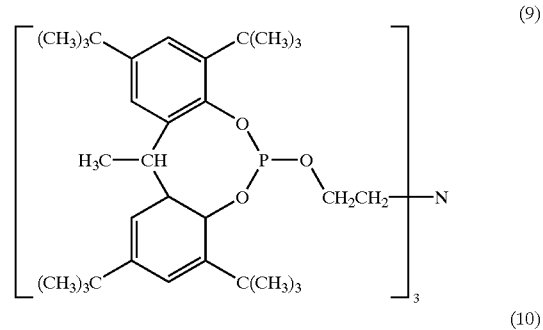

(9)

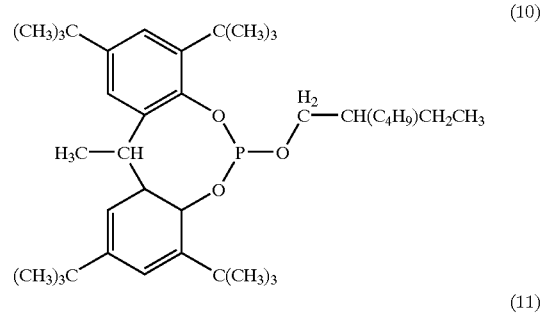

(10)

(11)

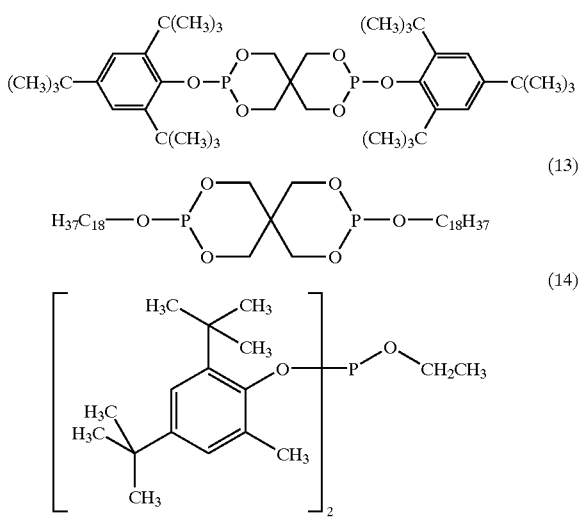

(12)

(13)

(14)

5. Suitable peroxide traps are for example esters of β-thiodipropionic acid, for example the lauryl, stearyl, myristyl or tridecyl esters, mercaptobenzimidazole or the zinc salt of 2-mercaptobenzimidazole, zincdibutyl dithiocarbamate, dioctadecyl disulfide, pentaerythritol tetrakis(dodecylmercapto)propionate. Individual compounds or mixtures thereof may be used.

6. Suitable basic co-stabilisers are for example melamine, poly(vinylpyrrolidone), dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate. Individual compounds or mixtures thereof may be used.

7. Suitable nucleating agents are for example inorganic substances such as talcum, metal oxides such as titanium dioxide or magnesium oxide, phosphates, carbonates or sulfates, preferably of alkaline earth metals; organic compounds such as mono-carboxylic acids or polycarboxylic acids and their salts, e.g. 4-tert.-butylbenzoic acid, adipic acid, diphenylacetic acid, sodium succinate or sodium benzoate; polymeric compounds such as ionic copolymers (ionomers). Particularly preferred are 1,3:2,4-bis(3',4'-dimethylbenzylidene)sorbitol, 1,3:2,4-di(paramethyldibenzylidene)sorbitol and 1,3:2,4-di(benzylidene)sorbitol. Individual compounds or mixtures thereof may be used.

8. Suitable fillers and reinforcing agents are for example calcium carbonate, silicates, glass fibres, glass balls, asbestos, talcum, kaolin, mica, barium sulfate, metal oxides and hydroxides, carbon black, graphite, wollastonite, sawdust and flour or fibres of other natural products, synthetic fibres. Individual compounds or mixtures thereof may be used.

9. Other suitable additives are for example plasticizers, lubricants, emulsifiers, pigments, viscosity modifiers, catalysts, flow-control agents, optical brighteners, flame retardants, antistatic agents and blowing agents.

10. Suitable benzofuranonones and indolinones are for example those that are disclosed in U.S. Pat. Nos. 4,325,863; 4,338,244; 5,175,312; 5,216,052; 5,252,643; DE-A-43 16 611; DE-A-43 16 622; DE-A-43 16 876; EP-A-0 589 839 or EP-A-0 591 102, or 3-[4-(2-acetoxyethoxy)phenyl]-5,7-di-tert.-butylbenzofuran-2-one, 5,7-di-tert.-butyl-3-[4-(stearoyloxyethoxy)phenyl]benzofuran-2-one, 3,3'-bis-[5,7-di-tert.-butyl-3-(4-[2-hydroxyethoxy]phenyl)benzofuran-2-one], 5,7-di-tert.-butyl-3-(4-ethoxyphenyl)benzofuran-2-one, 3-(4-acetoxy-3,5-dimethylphenyl)-5,7-di-tert.-butylbenzofuran-2-one, 3-(3,5-dimethyl-4-pivaloyloxyphenyl)-5,7-di-tert.-butylbenzofuran-2-one, 3-(3,4-dimethylphenyl)-5,7-di-tert.-butylbenzofuran-2-one, 3-(2,3-dimethylphenyl)-5,7-di-tert.-butylbenzofuran-2-one, lactone antioxidants such as

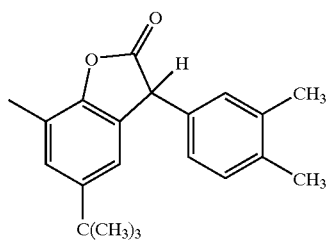

(15)

These compounds act for example as antioxidants. Individual compounds or mixtures thereof may be used.

11. Suitable fluorescing plasticizers are listed in "Plastics Additives Handbook", Eds. R. Gächter and H. Müller, Hanser Verlag, 3rd Edition, 1990, pp. 775–789.

12. Suitable mold release agents are esters of aliphatic acids and alcohols, for example pentaerythritol tetrastearate and glycerol monostearate, which are used alone or as a mixture, preferably in an amount of 0.02 to 1 wt. % relative to the weight of the composition.

13. Suitable flame-inhibiting additives are phosphate esters, i.e. triphenyl phosphate, resorcinol diphosphoric acid esters, bromine-containing compounds such as brominated phosphoric acid esters, brominated oligocarbonates and polycarbonates, as well as salts such as $C_4F_9SO_3^{31}Na^+$.

14. Suitable impact modifiers are butadiene rubber with grafted-on styrene-acrylonitrile or methyl methacrylate, ethylene-propylene rubbers with grafted-on maleic anhydride, ethyl acrylate and butyl acrylate rubbers with grafted-on methyl methacrylate or styrene-acrylonitrile, interpenetrating siloxane and acrylate networks with grafted-on methyl methacrylate or styrene-acrylonitrile.

15. Suitable polymers are SAN, ABS, PMMA, PTFE, PSU, PPS, polyolefins such as polyethylene, polypropylene and ethylene-propylene rubbers, epoxy resins, polyesters such as PBT, PET, PCT, PCTG and PETG as well as other polycarbonates produced in the interface process.

16. Suitable antistatic agents are sulfonate salts, for example tetraethylammonium salts of $C_{12}H_{25}SO^{3-}$ or $C_8F_{17}SO^{3-}$.

17. Suitable coloring agents are pigments as well as organic and inorganic dyes.

18. Compounds that contain epoxy groups, such as 3,4-epoxycyclohexylmethyl-3,4-epoxycyclohexylcarboxylate, copolymers of glycidyl methacrylate and epoxysilanes.

19. Compounds that contain anhydride groups, such as maleic anhydride, succinic anhydride, benzoacetic anhydride and phthalic anhydride.

The compounds of groups 18 and 19 act as melt stabilizers. They may be used individually or as mixtures.

The compositions (molding compounds) according to the invention are produced by mixing the respective constituents in a manner known per se and melt compounding and melt extruding the resultant mixtures at temperatures of about 200° C. and for example at temperatures of 200° C. to 300°

C. in conventional equipment such as internal kneaders, extruders and double-shaft screw extruders. The mixing of the individual constituents may take place successively as well as simultaneously, and more specifically at about 20° C. (room temperature) as well as at higher temperatures.

The molding compositions according to the invention may be used to produce all types of molded articles. These articles may be produced by injection molding, extrusion and blow molding processes. A further type of processing is the production of molded articles by thermoforming of previously produced sheets or films.

Examples of the molded articles according to the invention include profiled sections, sheets, all types of housing parts, e.g. for domestic appliances such as juice presses, coffee-making machines, mixers; for office equipment such as monitors, printers, copiers; for sheets, tubes, pipes, electrical installation ducting, windows, doors and profiled sections for the building and construction sector, interior fittings and external applications; in the electrical technology field, such as for switches and plugs. In addition the molded articles according to the invention may be used for internal fittings and structural parts of tracked vehicles, boats, aircraft, buses and other vehicles, as well as for vehicle body parts.

The molded articles according to the invention may be transparent or opaque. Further molded articles include in particular optical and magnetooptical data storage media such as mini discs, compact discs (CDs) or digital versatile discs (DVDs), packaging for foodstuffs and beverages, optical lenses and prisms, lenses for illumination purposes, vehicle headlamp lenses, glazing for building and construction vehicles and road vehicles, other types of transparent panels, for example for greenhouses, so-called reinforced sandwich panels, or hollow cavity plates.

The following examples serve to illustrate the invention in more detail.

EXAMPLES

Examples 1 to 8

Comparison Examples 1 to 6

The polymers of Examples 1 to 8 were produced by melt polymerization of diphenyl carbonate and bisphenol A using tetraphenylphosphonium phenolate as catalyst, sodium phenolate being used in addition in Examples 7 and 8. The monomer and catalyst amounts are shown in Table 1. The reaction conditions are given in Table 2. The relative viscosity of the solution, the yellowness index (YI), the melt viscosity, the shear thinning ratio and the amounts of the multifunctional compounds are given in Table 3.

The comparison examples 1, 2, 3 and 4 involve linear polycarbonates that were produced according to a conventional interface polymerization process. The polycarbonates are marketed under the trademark Makrolone® 2808, 2408, KU1-1266 and 3108 by Bayer AG. The polymers of comparison examples 5 and 6 are branched polycarbonates that were produced by the interface polymerization process. Corresponding products are marketed by Bayer AG under the trademark Makrolon® 1243 and 1239. The relative viscosity was measured in a 0.5% solution of methylene chloride at 20° C.

The yellowness index (YI) was determined on 4 mm thick injection molded samples in accordance with CIELAB methods. The injection molding was carried out at 270° C. and 330° C.

The melt viscosity was determined at 280° C. using the test method according to ISO 11443. The non-Newtonian flow behavior was quantified by calculating the shear thinning ratio. The shear thinning ratio was calculated as the melt viscosity at a shear rate of 50 s$^{-1}$, divided by the melt viscosity at a shear rate of 5,000 s$^{-1}$.

The amount of the multifunctional compounds was determined by separating the monomeric compounds using HPLC (high pressure liquid chromatography) after complete hydrolysis of the polycarbonate. These compounds were characterized by magnetic resonance spectroscopy techniques.

TABLE 1

| Example | 1 | 2 | 3 | 4 | 5 | 6 | 7 | 8 |
|---|---|---|---|---|---|---|---|---|
| DPC, mole | 1.234 | 1.178 | 1.173 | 1.198 | 1.168 | 1.187 | 1.190 | 1.180 |
| BPA, mole | 1.0 | 1.0 | 1.0 | 1.0 | 1.0 | 1.0 | 1.0 | 1.0 |
| Sodium phenolate (ppb), calculated as sodium | 0.0 | 0.0 | 0.0 | 0.0 | 0.0 | 0.0 | 125 | 100 |
| Tetra-phenyl-phosphonium phenolate, mole | $4 \times 10^{-5}$ | $4 \times 10^{-5}$ | $4 \times 10^{-5}$ | $4 \times 10^{-5}$ | $4 \times 10^{-5}$ | $4 \times 10^{-5}$ | $4 \times 10^{-5}$ | $4 \times 10^{-5}$ |

DPC: diphenyl carbonate; BPA: bisphenol A

TABLE 2

| Reaction conditions for Examples 1–8 | Time (min.) | Temperature (° C.) | Pressure (mbar) |
|---|---|---|---|
| Precondensation | 45 | 190 | 1000 |
| Reactor I | 20 | 190 | 200 |
| Reactor II | 20 | 230 | 80 |
| Reactor III | 10 | 250 | 50 |
| Reactor IV | 10 | 270 | 25 |
| Reaction conditions for Example 1 | | | |
| Evaporator I | 45 | 275 | 5.3 |
| Evaporator II | 130 | 312 | 0.55 |
| Reaction conditions for Example 2 | | | |
| Evaporator I | 45 | 275 | 7.3 |
| Evaporator II | 130 | 312 | 1.35 |
| Reaction conditions for Example 3 | | | |
| Evaporator I | 45 | 275 | 7.3 |
| Evaporator II | 130 | 312 | 1.00 |

TABLE 2-continued

| Reaction conditions for Examples 1–8 | Time (min.) | Temperature (° C.) | Pressure (mbar) |
|---|---|---|---|
| Reaction conditions for Example 4 | | | |
| Evaporator I | 45 | 275 | 7.3 |
| Evaporator II | 130 | 312 | 1.85 |
| Reaction conditions for Example 5 | | | |
| Evaporator I | 45 | 275 | 7.3 |
| Evaporator II | 130 | 312 | 0.98 |
| Reaction conditions for Example 6 | | | |
| Evaporator I | 45 | 275 | 5.5 |
| Evaporator II | 130 | 312 | 0.50 |
| Reaction conditions for Example 7 | | | |
| Evaporator I | 45 | 275 | 7.0 |
| Evaporator II | 130 | 310 | 1.85 |
| Reaction conditions for Example 8 | | | |
| Evaporator I | 45 | 275 | 7.4 |
| Evaporator II | 130 | 310 | 1.40 |

TABLE 3

| Example | | V1 | V2 | V3 | V4 | V5 | V6 | 1 | 2 |
|---|---|---|---|---|---|---|---|---|---|
| Relative viscosity | | 1.294 | 1.259 | 1.195 | 1.322 | 1.287 | 1.318 | 1.201 | 1.253 |
| YI (molding at 270° C.) | | 2.0 | 1.8 | 1.8 | | | | 3.7 | 3.0 |
| YI (molding at 330° C.) | | 2.4 | 2.0 | 1.9 | | | | 3.7 | 2.7 |
| Melt viscosity at 50 s$^{-1}$ and 280° C. | Pa·s | 1002 | 593 | 129 | 1685 | 1272 | 2075 | 139 | 447 |
| Melt viscosity at 5,000 s$^{-1}$ and 280° C. | Pa·s | 186 | 148 | 74 | 214 | 167 | 205 | 74 | 130 |
| Shear thinning Ratio | | 5.4 | 4.0 | 1.7 | 7.9 | 7.6 | 10.1 | 1.9 | 3.4 |
| A | ppm | <5 | <5 | <5 | <5 | <5 | <5 | 253 | 272 |
| B | ppm | <5 | <5 | <5 | <5 | <5 | <5 | 26 | 16 |
| C | ppm | <5 | <5 | <5 | <5 | <5 | <5 | <5 | 57 |
| D | ppm | <5 | <5 | <5 | <5 | <5 | <5 | 157 | 117 |

| Example | | 3 | 4 | 5 | 6 | 7 | 8 |
|---|---|---|---|---|---|---|---|
| Relative viscosity | | 1.277 | 1.218 | 1.287 | 1.283 | 1.249 | 1.292 |
| YI (molding at 270° C.) | | 2.6 | 2.6 | 2.6 | 2.8 | 3.5 | 3.7 |
| YI (molding at 330° C.) | | 2.5 | 2.6 | 2.6 | 2.8 | | 3.8 |
| Melt viscosity at 50 s$^{-1}$ and 280° C. | Pa·s | 770 | 218 | 904 | 782 | 438 | 1071 |
| Melt viscosity at 5,000 s$^{-1}$ and 280° C. | Pa·s | 160 | 94 | 170 | 159 | 117 | 188 |
| Shear thinning Ratio | | 4.8 | 2.3 | 5.3 | 4.9 | 3.7 | 5.7 |
| A | ppm | 226 | 268 | 256 | 231 | 1387 | 1475 |
| B | ppm | 6 | 16 | 21 | 10 | 289 | 337 |
| C | ppm | <5 | <5 | 59 | 53 | 197 | 178 |
| D | ppm | 138 | 188 | 175 | 144 | 720 | 692 |

Although these new melt-polymerized polycarbonates contain multifunctional structural units, they exhibit the same flow behavior as characterized by the shear thinning ratio, as the interface-polymerized linear polycarbonates of the same relative viscosity. The polycarbonates are also characterized by a surprisingly good color stability during injection molding. In comparison, the branched polycarbonates 5 and 6 exhibit a high degree of non-Newtonian flow behavior, which is typical of a branched polymer. The comparison examples 5 and 6 contain 3,000 ppm of branching agent.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A melt-polymerized polycarbonate containing multi-functional branching units having a shear thinning ratio (y) that is defined by the limiting values of the following equation $$c+ax^b > y > -c+ax^b$$

wherein $y \geq 1$, c is 0.3 to 0.1, b is $14.831 \pm 0.05$, a is $0.1262 \pm 0.005$, and x is the relative viscosity of the polycarbonate.

2. The melt-polymerized polycarbonate according to claim 1, wherein c is 0.2 to 0.1.

3. The melt-polymerized polycarbonate according to claim 1 wherein b is $14.831 \pm 0.04$.

4. The melt-polymerized polycarbonate according to claim 2 wherein b is $14.831 \pm 0.04$.

5. The melt-polymerized polycarbonate according to claim 1 wherein a $0.1262 \pm 0.004$.

6. A melt-polymerized polycarbonate of the general formula (1)

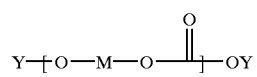

(1)

wherein the square brackets denote repeating structural units,

M denotes Ar or a multifunctional compound A, B, C or D, wherein

Ar is represented by Formula (2)

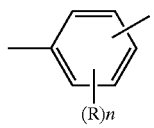

(2)

or by Formula (3)

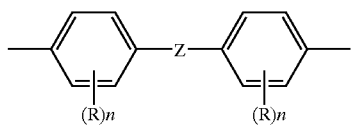

(3)

wherein

Z denotes $C_1$–$C_8$ alkylidene or $C_5$–$C_{12}$ cycloalkylidene, S, $SO_2$ or a single bond, R denotes a substituted or unsubstituted phenyl, methyl, propyl, ethyl, butyl, Cl or Br, and n denotes 0, 1 or 2, wherein the multifunctional compound A conforms to the formula

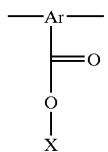

(A)

and is contained in amounts of <1,500 ppm, wherein the multifunctional compound B conforms to the formula

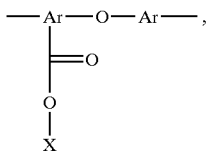

(B)

and is contained in amounts of <350 ppm, wherein the multifunctional compound C conforms to the formula

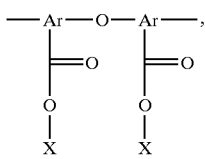

(C)

and is contained in amounts of <200 ppm, wherein compound D conforms to the formula

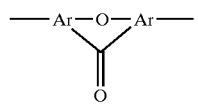

(D)

and is contained in amounts of <750 ppm, wherein Y is H or a compound of the formula (4)

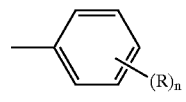

(4)

wherein

R is H, $C_1$–$C_{20}$ alkyl, -alkylaryl, -cycloalkyl, -oxyalkyl, -oxyaryl, $C_6H_5$ or $C(CH_3)_2C_6H_5$, and may be identical or different, n is 0, 1, 2 or 3, X is Y or —(MOCOO)Y, M and Y have the meanings given above.

7. The melt-polymerized polycarbonate according to claim 6, wherein Ar is a compound of the formula

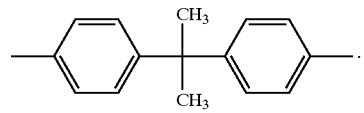

(2.1)

8. A molding composition comprising the melt-polymerized polycarbonate according to claim 1.

9. A molded article containing the composition according to claim 8.

10. A melt polymerization process for the production of polycarbonate, comprising reacting at least one diphenol and/or carbonate oligomer with at least one hydroxy terminal groups or carbonate terminal groups in the presence of a catalyst at a temperature of 150° to 400° C. and a pressure of 1,000 mbar to 0.01 mbar, said catalyst conforming to the formula (7)

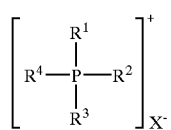

(7)

wherein $R^1$, $R^2$, $R^3$ and $R^4$, independently one of the other denote $C_1$ to $C_{18}$ alkylenes, $C_6$ to $C_{10}$ aryl compounds or $C_5$ to $C_6$ cycloalkyl groups, and $X^-$ denotes an anion, in which the corresponding acid-base pair $H^+ + X^- \leftrightarrows HX$ has a $pK_b$ of <11, and wherein the melt polymerization process is a continuous process comprising cascading stages wherein the final stage is conducted at a temperature of from 310° to 400° C.

11. The melt polymerization process according to claim 10, wherein the catalyst is a mixture of tetraphenylphosphonium phenolate and 1–200 ppm, relative to sodium, of sodium phenolate.

* * * * *